(12) United States Patent
Mökander et al.

(10) Patent No.: US 12,332,641 B2
(45) Date of Patent: Jun. 17, 2025

(54) METHOD FOR MONITORING AND CONTROLLING THE OPERATION OF A PUMP STATION

(71) Applicant: Xylem Europe GmbH, Schaffhausen (CH)

(72) Inventors: Jürgen Mökander, Sollentuna (SE); Martin Wessman, Solna (SE); Staffan Aldenfalk, Solna (SE)

(73) Assignee: Xylem Europe GmbH, Schaffhausen (CH)

( * ) Notice: Subject to any disclaimer, the term of this patent is extended or adjusted under 35 U.S.C. 154(b) by 355 days.

(21) Appl. No.: 17/920,257

(22) PCT Filed: Apr. 27, 2021

(86) PCT No.: PCT/EP2021/060891
§ 371 (c)(1),
(2) Date: Oct. 20, 2022

(87) PCT Pub. No.: WO2021/219584
PCT Pub. Date: Nov. 4, 2021

(65) Prior Publication Data
US 2023/0176563 A1    Jun. 8, 2023

(30) Foreign Application Priority Data
Apr. 27, 2020    (EP) .................................... 20171480

(51) Int. Cl.
*G05B 23/02*    (2006.01)
*E03F 5/22*    (2006.01)

(52) U.S. Cl.
CPC ............ *G05B 23/0283* (2013.01); *E03F 5/22* (2013.01)

(58) Field of Classification Search
CPC ........ G05B 23/0283; E03F 5/22; F04D 13/00; F04D 13/14; F04D 13/16; F04D 15/00;
(Continued)

(56) References Cited

U.S. PATENT DOCUMENTS

2011/0081255 A1    4/2011   Steger et al.
2018/0066651 A1*   3/2018   Beard ................... F04B 23/021
2021/0215158 A1*   7/2021   Schou ................. F04D 15/0088

FOREIGN PATENT DOCUMENTS

| EP | 2746477 A1 | 6/2014 |
|----|------------|--------|
| EP | 3567256 A1 | 11/2019 |
| WO | 2016132107 A1 | 8/2016 |

OTHER PUBLICATIONS

International Search Report and Written Opinion for International Application No. PCT/EP2021/060891, dated May 28, 2021, 13 pages.

* cited by examiner

*Primary Examiner* — Catherine T. Rastovski
*Assistant Examiner* — Matthew W. Baca
(74) *Attorney, Agent, or Firm* — Buchanan Ingersoll & Rooney PC

(57) ABSTRACT

The invention relates to a method for monitoring and controlling the operation of a pump station (1) comprising a tank (8) for storage of a liquid and at least one pump (2), the pump station (1) further comprises an outlet conduit (5) connected to the pump (2), the method comprising the steps of: determining the Geodetic head (Hgeo) of the pump station (1), determining the pumped Flow (Q) for a given pump operation duty point, determining the consumed Power (P) for the given pump operation duty point, and determining a Normalized Specific Energy (nSE) of the pump station (1) based on the determined values of Geodetic
(Continued)

head (Hgeo), pumped Flow (Q) and consumed Power (P), by means of the formula (nSE)=(P/Q)/Hgeo.

18 Claims, 2 Drawing Sheets

(58) Field of Classification Search
CPC ............ F04D 15/0088; F04D 15/0245; F04D 15/029; F04D 17/10; F04D 29/607; F04D 15/0066; F04B 2203/0208; F04B 2205/00; F04B 2205/01; F04B 2205/05; F04B 2205/06; F04B 2205/063; F04B 2205/064; F04B 2205/07; F04B 2205/08; F04B 2205/09; F04B 2207/00; F04B 2207/01; F04B 2207/02; F04B 2207/041; F04B 2207/042; F04B 23/00; F04B 23/02; F04B 23/021; F04B 49/00; F04B 49/065; F04B 51/00; F04B 15/023
See application file for complete search history.

METHOD FOR MONITORING AND CONTROLLING THE OPERATION OF A PUMP STATION

CROSS-REFERENCE TO RELATED APPLICATIONS

This application is the US National Phase of International Application No. PCT/EP2021/060891, filed Apr. 27, 2021, which claims priority to European Application No. 20171480.5, filed Apr. 27, 2020. The disclosures of these applications are incorporated herein by reference in their entireties for all purposes.

TECHNICAL FIELD OF THE INVENTION

The present invention belongs to the technical field of pump stations and methods for monitoring the operation of such pump stations and controlling the operation of such pump stations, especially pump stations configured for pumping liquid comprising solid matter, such as wastewater. The pump station comprises a tank for temporary storage of a liquid and at least one pump configured for transporting the liquid away from the tank, the pump station further comprises an outlet conduit connected to the pump.

BACKGROUND OF THE INVENTION

A pump station typically has a reservoir for holding a liquid, such as a well, a sump, a holding tank or a tank. In some pump stations, there may be multiple wells/sumps that are separated from or connected to each other. One or more pumps can be used to transport liquid into or out of the reservoir. For example, pumps may be used to transport sewage out of sumps in sewage pump stations, or to pump fresh water into holding tanks in clean water boost stations.

A typical liquid reservoir for wastewater has an inlet to admit liquid to enter the tank and an outlet through which the liquid is removed/discharged from the tank. Each liquid reservoir has one or more pumps associated with the outlet. The pumps, when activated and in operation, transport the liquid, as required based on appropriate control signals. A single operator may have responsibility for many pump stations scattered over vast geographic areas, for instance the operator may have responsibility for hundreds or thousands of individual pumps. It is known to maintain and service pumps and pump stations at regular time intervals. However, this may result in pumps that are operating within acceptable parameters being serviced when not needed, and faulty pumps not being maintained when needed, thus resulting in failure. It is also known to monitor pump operating parameters, such as the individual pump efficiency (the electrical energy required to move a fixed volume of liquid), to determine whether a pump station is operating within acceptable parameters, and normal pump station service is based on the monitored parameters. However, each pump station operates under different conditions, i.e. different operational environments, and so the monitored parameters from different pump stations may not be compared.

WO 2016/132107 discloses a pump station monitoring system and method which tries to solve to problem stated above, i.e. compare different pump stations with each other. This patent application tries to determine a "Normalized pumping station efficiency". The explicit aim of the WO 2016/132107 is to compare the performance of different pump stations working under different conditions with each other, in order to determine which pump station needs maintenance.

However, according to the inventors of the present invention the finding/teaching of WO 2016/132107 is defective. In fact, from the "normalized pumping station efficiency" the operator will not be able to draw the promised conclusions, or at least the risk of obtaining defective or misleading performance data is high.

OBJECT OF THE INVENTION

The present invention aims at obviating the aforementioned disadvantages and failings of previously known pump station monitoring system and control systems. A primary object of the present invention is to provide an improved method and apparatus for monitoring and controlling a pump station, whereby an operator may more accurately compare performance of different pump stations working under different environmental conditions in order to be able to prioritize service and maintenance of said pump stations, or to decide about investments to improve energy efficiency.

SUMMARY OF THE INVENTION

According to the invention at least the primary object is attained by means of the initially defined method for monitoring and controlling the operation of a pump station as well as a pump station having the features defined in the independent claims. Preferred embodiments of the present invention are further defined in the dependent claims.

According to a first aspect of the present invention, there is provided a method for monitoring and controlling the operation of a pump station, wherein the pump station comprises a tank for temporary storage of a liquid and at least one pump configured for transporting the liquid away from the tank, the pump station further comprises an outlet conduit connected to the pump, the method is characterized by the steps of:
- determining the Geodetic head ($H_{geo}$) of the pump station,
- determining the pumped Flow (Q) for a given pump operation duty point,
- determining the consumed Power (P) for the given pump operation duty point, and
- determining a Normalized Specific Energy (nSE) of the pump station based on the determined values of Geodetic head ($H_{geo}$), pumped Flow (Q) and consumed Power (P), by means of the formula $nSE = (P/Q)/H_{geo}$.

Thus, the present invention is based on the insight of using the Geodetic Head ($H_{geo}$) of the pump station, instead of the Total Head ($H_{tot}$) of the pump station as in the acknowledged prior art document, for a better monitoring and control of the pump station. Thereby, the inventive method provides a value for how much energy is needed for the specific pump to lift one liter of liquid one meter in the specific pump station. Said meter is a real/true vertical meter. The prior art documents provides a value for how much energy is needed to lift one liter of liquid one experienced pressure-meter.

In particular, the determination of service need is highly improved with the inventive method as values of the normalized specific energy can be compared over time, i.e. before and after a change or service of the pump and/or parts of the outlet piping which is not possible with known methods. Thereto, by means of the inventive method different pump stations may be compared with each other. Thus, a true/real vertical meter will not vary over time since it is not changed if the outlet piping is changed or clogged or the pump is changed or serviced, opposite to the prior art method using the Total Head (Htot) of the pump. Thus, the inventive method is insensitive to dynamic hardware changes in the pump station, which is not the case with the prior art normalized pump efficiency method. When using the prior art method in the case when the outlet conduit is under-dimensioned or getting clogged, then both the nominator (P/Q) and the denominator (Htot) will increase and thereby these increases will at least partly eliminate each other in the calculation.

Using the method according to the present invention one can determine if the dimension/design of an outlet piping from the pump station is optimal or not and/or if said outlet piping is getting clogged. In the method according to the present invention one can compare old measurement data with new measurement data regardless of the outlet piping is changed and/or the pump is renewed. The comparison is possible with the inventive method because in the formula only the Geodetic Head (Hgeo) of the pump station is present, whereby a true/real vertical meter is fixed regardless of the properties of the pump and/or outlet piping. This is not possible with the prior art method as the old and new measurement may be more or less the same in many cases although significant changes to the pump station has been made, i.e. a change of out piping and/or a pump will affect the denominator as well as the nominator, whereas in the inventive method a change of outlet piping and/or pump will only affect the nominator and not the denomonator.

In various example embodiments of the present invention the outlet conduit of the pump station further comprises a non-return valve, wherein the Geodetic head (Hgeo) of the pump station is determined based on at least a determined back pressure at the downstream side of the non-return valve when the non-return valve is closed.

In various example embodiments of the present invention the outlet conduit of the pump station further comprises a pressure sensor located on the downstream side of the non-return valve, wherein the back pressure downstream the non-return valve is determined by measuring the back pressure at the downstream side of the non-return valve using the pressure sensor when the non-return valve is closed.

The advantage of these embodiments is that a determination of the Geodetic Head (Hgeo) is possible by means of the pressure sensor located on the downstream side of the non-return valve, i.e. the Geodetic Head must not be programmed into the control unit in situations/environments where the true Geodetic/Elevated Head is hard to determine/measure. The pressure sensor shall be arranged in close vicinity of the non-return valve.

In various example embodiments according to the present invention the step of closing the non-return valve is performed by turning the pump OFF. The advantage of these embodiments is that a simple construction and automatic closing of the non-return valve is performed when the pump is in OFF state and during said OFF state it is easy to determine the back pressure at the downstream side of the non-return valve, for instance by using a pressure sensor.

In various example embodiments according to the present invention the pump station further comprises a pressure sensor located on the downstream side of the non-return valve, wherein the pumped Flow (Q) is determined by:

measuring the static pressure (Hmeasure) at the downstream side of the non-return valve using the pressure sensor when the pump is operated at the given pump operation duty point and is pumping liquid passed the non-return valve, wherein the Static head (Hstat) of the pump is determined based on the measured static pressure (Hmeasure) and a pressure difference corresponding to the difference in height position between the downstream side of the non-return valve and the liquid level in the tank, and determining the pumped Flow (Q) by using the determined Static head (Hstat) of the pump from a predetermined pump specific Q-Hstat-relationship.

The advantage of these embodiments is that no additional flow measurement equipment is needed for determining the pumped Flow (Q), one and the same pressure sensor can be used for determining the Geodetic Head (Hgeo) when the pump is in OFF state and the pumped Flow (Q) when the pump is in ON state together with a pump specific Q-Hstat-relationship.

In various example embodiments according to the present invention the consumed Power (P) is determined by using the determined pumped Flow (Q) from a predetermined pump specific Q-P-relationship. The advantage of these embodiments is that not only the pumped Flow (Q) can be determined using the pressure sensor located downstream the non-return valve but also the consumed Power (P), the latter one by using the pump specific Q-P-relationship.

In various example embodiments according to the present invention the pump station further comprises a flowmeter located downstream the pump, wherein the pumped Flow (Q) is determined by means of the flowmeter when the pump is operated at the given pump operation duty point and is pumping liquid passed the non-return valve. The advantage of this embodiment is that it provides for an additional flow determination means which could be used in parallel to or instead of the Static Head (Hstat) of the pump and the pump specific Q-Hstat-relationship.

In various example embodiments according to the present invention the Geodetic head (Hgeo) of the pump station is determined based on the determined back pressure downstream the non-return valve, a pressure difference corresponding to the difference in height position (Y) between the downstream side of the non-return valve and the outlet of the pump, a pressure difference corresponding to the difference in height position (X) between the liquid level in the tank and a level sensor located in the tank, and a pressure difference corresponding to the difference in height position (Z) between the outlet of the pump and the level sensor located in the tank. The advantage of these embodiments is that the Geodetic Head (Hgeo) is more accurately determined.

According to another aspect of the present invention it is provided a pump station, wherein the pump station comprises a tank for temporary storage of a liquid and at least one pump configured for transporting the liquid away from the tank, the pump station further comprises an outlet conduit connected to the pump, wherein the outlet conduit comprises a non-return valve and a pressure sensor located at the downstream side of said non-return valve, wherein the pump station further comprises a control unit configured for determining a Normalized Specific Energy (nSE) of the pump station based on the determined values of Geodetic head (Hgeo) of the pump station, pumped Flow (Q) for a given pump operation duty point and consumed Power (P) for the given pump operation duty point, by means of the formula (nSE)=(P/Q)/Hgeo. The advantage of this embodiment is that such pump station provides for a simple, non-expensive and robust solution for determining the Geodetic Head (Hgeo) of the pump station and/or the Static Head (Hstat) of the pump. The advantage is also that pump station may with a local control unit determine when one or a plurality of components of such pump station need service and thereby trigger a service or alarm signal to an operator and/or external control unit.

In various example embodiments according to the present invention said outlet conduit further comprises a flowmeter downstream said pump. The advantage of these embodiments is that flow and pressure may be determined by dedicated sensors in the outlet conduit.

In various example embodiments according to the present invention said pump station further comprises a control unit configured for at least partly controlling said pump based on measurement data received from the pump station. The advantage of these embodiments is that monitoring and control may be performed locally and in any event of abnormal data an alarm signal may be sent to an external control unit and/or operator.

In yet another aspect of the present invention it is provided a non-transitory computer-readable storage medium having computer-readable program code portions embedded therein, wherein the computer-readable program code portions are configured to execute the steps of the inventive method according claim 1 in order to determine a Normalized Specific Energy (nSE) when executed by a computer.

Further advantages with and features of the invention will be apparent from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

Figure 1:
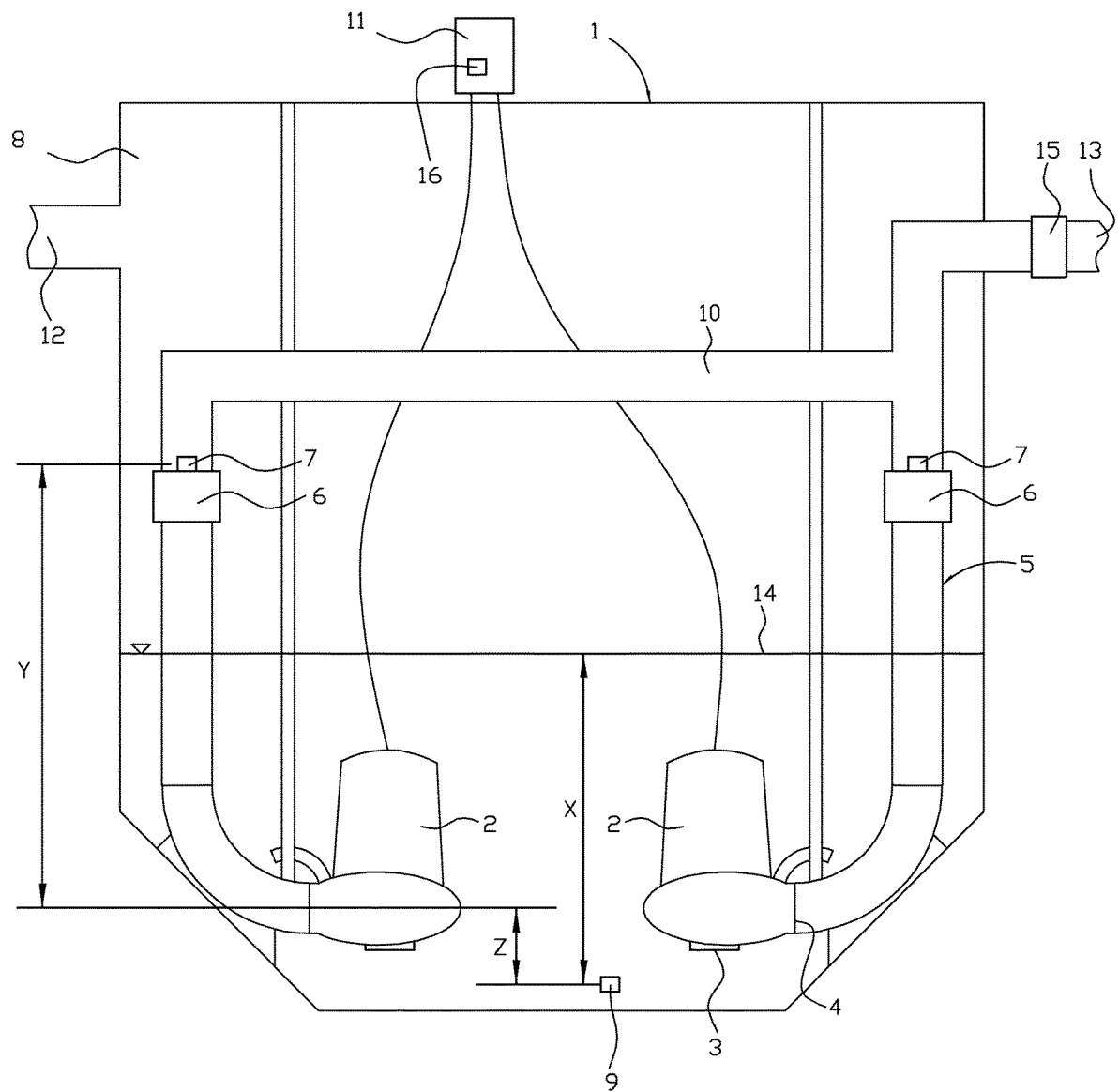
FIG. 1 is a schematic view of an example embodiment of a pump station according to the present invention.

The invention is applicable to a pump station and concern monitoring the operation of a pump station and the control of the operation of the pump station. Reference is initially made to FIG. 1 illustrating a pump station 1, e.g. a wastewater pump station, however other liquids may be pumped and the invention is not limited to wastewater.

The pump station 1 comprises at least one pump 2 having an inlet 3 and an outlet 4, an outlet pipe 5 connected to the pump 2 and extending from the pump outlet 4, a non-return valve 6 arranged downstream the pump 2 and a pressure sensor 7 arranged at the downstream side of the non-return valve 6. The pump station 1 comprises a tank 8, also known as reservoir, sump, etc. configured for temporary storage of liquid. The pump 2 is configured for transporting the liquid away from the tank 8 via the outlet conduit 5. The pump 2 is preferably located in the tank 8, and the pump 2 may be located in partly or fully submerged position or in a dry position.

The disclosed pump station 1 also comprises a level sensor 9 located in the tank 8 and preferably in a position always submerged when the pump station 1 is in operation. Thus, the level sensor 9 is preferably located below the inlet 3 of the pump 2. According to various alternative embodiments the level sensor is constituted by a dry installed level sensor, e.g. using ultrasound, radar, etc., hanging above the liquid level and/or located outside the tank 8.

Usually this type of pump stations 1 comprises at least two pumps, wherein the second pump is used to prevent flooding and/or as a backup if the first pump malfunctions and/or the two pumps alternate. The second pump having an inlet and an outlet, an outlet pipe 10 extending from the pump outlet and is connected to the outlet pipe 5 of the first pump 2. The outlet pipe 10 of the second pump preferably also comprises a non-return valve 6 arranged downstream the second pump and a pressure sensor 7 arranged at the downstream side of the non-return valve 6. The non-return valves are arranged to prevent the pumped flow from one of the pumps to return to the tank 8 via the other pump, and also to prevent the liquid in the outgoing piping from returning to the tank 8 when the pumps are deactivated.

A local control unit 11 is operatively connected to the pumps 2 and different sensors in the pump station 1, and may further be operatively connected to a remote/external control unit (not shown). The local control unit may by partly or fully located inside the pump 2. The pump station 1 comprises an inlet 12 for incoming/influent liquid and an outlet 13 for discharged/effluent liquid, the outlet 13 is part of the outlet pipe 5 and/or the outlet pipe 10. External outlet piping is connected to the outlet 13 and the external outlet piping guides the pumped liquid for example to another pump station and/or a wastewater plant. Everything described in connection with said at least one pump 2 is applicable also for the other pumps in the pump station 1. During operation of the pump station 1 the liquid level 14 in the tank 8 will rise and fall depending on the influent liquid and the operation of the pump 2.

Figure 2:
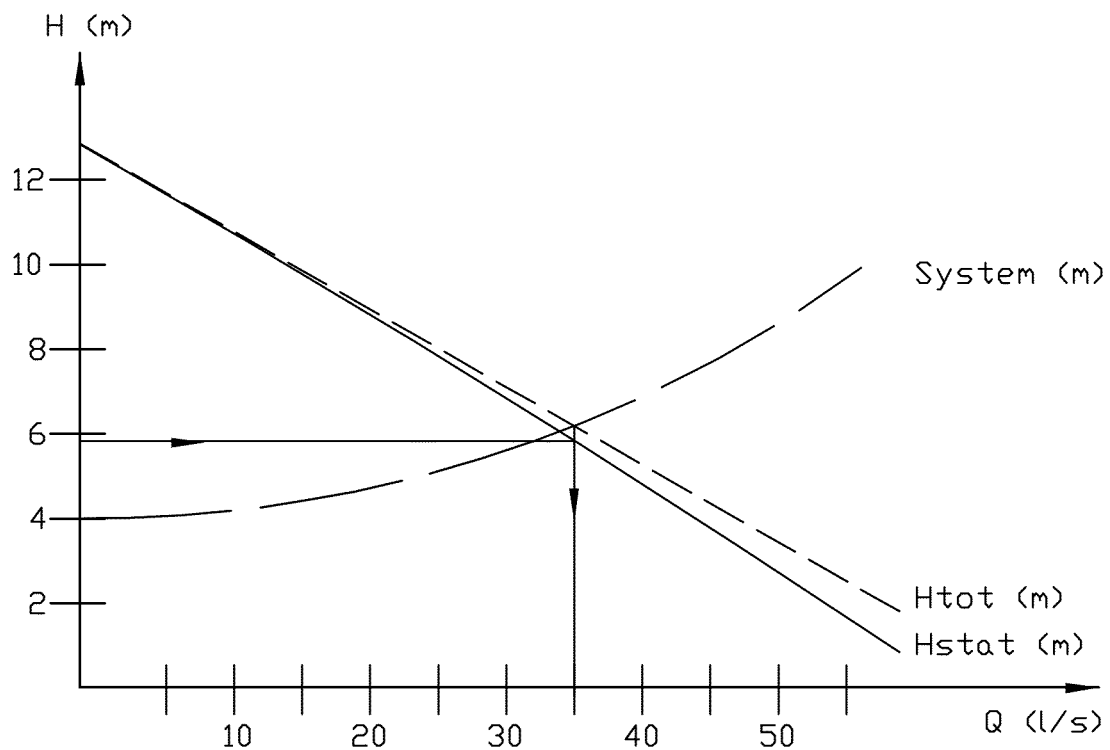
FIG. 2 is a schematic example diagram of a Q-Hstat-relationship for a pump in a pump station according to FIG. 1.

FIG. 2 illustrates a schematic example diagram of a pump specific Q-Hstat-relationship and Q-Htot-relationship for a specific pump 2 and the Q-H-relationship for the specific pump station 1. The broken/dashed line using short segments is the socalled "pump curve" and this is a fixed and known Q-Htot-relationship between pumped flow Q and Total head Htot for a given frequency (operational speed) of the specific pump 2. If the frequency (operational speed) of the pump 2 is adjusted/altered the "pump curve" line will move towards bottom-left and be steeper if the speed of the pump is decreased and towards top-right and be more horizontal if the speed of the pump is increased. Thus, the disclosed diagram is for a given operational speed for the pump 2. The broken/dashed line using long segments is the socalled "system curve" and this is specific for each pump station 1 and its special conditions (operational environment). The special conditions of the pump station 1 will decide the curvature of the "system curve". The operational duty point of the pump 2 for the specific pump station 1, i.e. the frequency or operational speed used by the pump 2, is illustrated by the intersection between said "pump curve" and said "system curve". The disclosed duty point of the pump 2 provides a pumped Flow (Q) equal to about 35 liters/second and a Total head (Htot) of the pump 2 equal to about 6.2 meters, i.e. the pump 2 will experience a backpressure equal to about 6.2 meters water column and will be able to pump 35 liters per second at the given frequency (operational speed) of the pump 2. A different pump station 1 having the same type of pump 2 will have the same "pump curve" but a different "system curve" due to a different operational environment, i.e. different outlet conduit configuration and Geodetic head (Hgeo) of the pump station 1 and thereby a different back pressure and thereby a different pumped Flow (Q).

Figure 3:
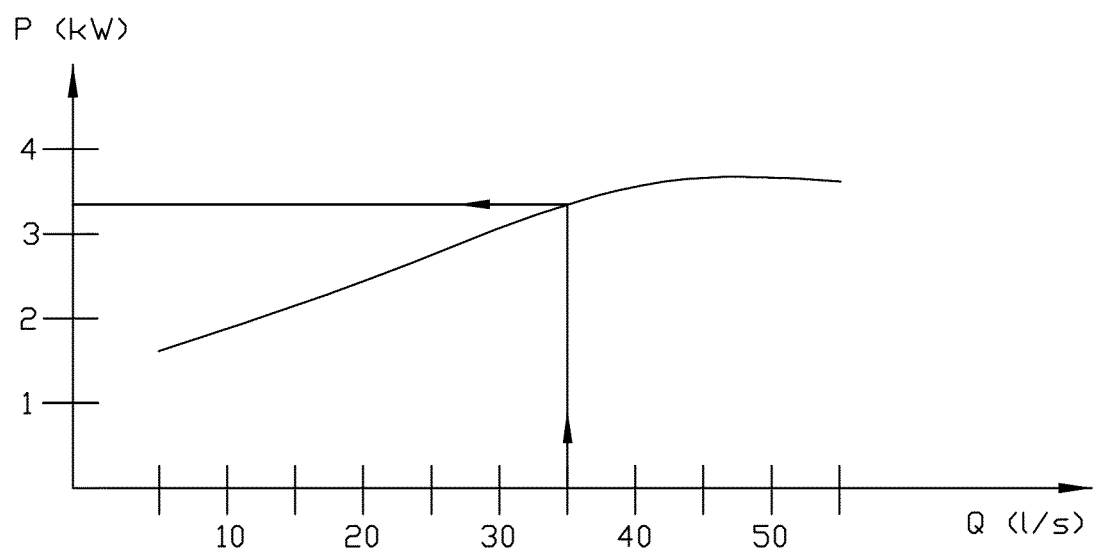
FIG. 3 is a schematic example diagram of a Q-P-relationship for a pump in a pump station according to FIG. 1.

Thereto, the specific pump 2 also has a fixed and known "power performance" Q-P-relationship between the power P and the pumped Flow (Q) for each given pump operation duty point, as schematically illustrated in FIG. 3.

The invention is how to decide the "Normalized Specific Energy" for the specific pump station 1 by monitoring and controlling the operation of the pump station, and this value can be used to compare different pump stations with each other and/or to compare the specific pump station 1 over time. The comparison will give the operator/owner knowledge about which pump station is the least energy efficient and based on this knowledge the operator/owner may install a bigger/different pump in the pump station, install outlet piping having greater diameter or different configuration, which pump station 1 that needs service, etc.

The inventive term "Normalized Specific Energy" (nSE) is equal to consumed Power (P) divided by pumped Flow (Q) divided by the Geodetic head (Hgeo): nSE=(P/Q)/Hgeo. The Geodetic head (Hgeo) is the vertical distance between the liquid level 14 of the tank 8 and the highest elevation/crest of the outlet piping. Thus, the Geodetic head (Hgeo) will vary over a pumping cycle due to changing liquid level 14 in the tank 8.

It shall be pointed out that consumed Power and pumped Flow may be momentary measures or measured over time, for instance at a predetermined liquid level 14 in the tank 8 or during an entire pump cycle. The Geodetic head (Hgeo) needs to be determined accordingly.

Thus, the inventive method comprises the steps of: determining the Geodetic head (Hgeo) of the pump station 1, determining the pumped Flow (Q) for a given pump operation duty point, determining the consumed Power (P) for the given pump operation duty point, and determining a Normalized Specific Energy (nSE) of the pump station 1 based on the determined values of Geodetic head (Hgeo), pumped Flow (Q) and consumed Power (P), by means of the formula (nSE)=(P/Q)/Hgeo.

Wherein these steps are performed by monitoring and/or controlling the operation of the pump station. For instance, in order to determine the pumped Flow (Q) the pump of the pump station must be operated in a suitable way and the flow from the pump monitored in a suitable way, directly or indirectly. For instance, in order to determine the consumed power (P) the pump of the pump station must be operated in a suitable way and the flow from the pump monitored in a suitable way, directly or indirectly.

According to various embodiments, when the outlet conduit 5 of the pump station 1 comprises a non-return valve 6, the step of determining the Geodetic head (Hgeo) of the pump station 1 comprises the steps of: closing the non-return valve 6, determining the back pressure at the downstream side of the non-return valve 6, wherein the Geodetic head (Hgeo) of the pump station 1 is determined based on the determined back pressure downstream the non-return valve 6 and a pressure difference corresponding to the difference in height position between the downstream side of the non-return valve 6 and the liquid level 14 in the tank 8. Relevant for both submerged level sensor 9 and dry installed level sensor.

According to various embodiments, the Geodetic head (Hgeo) of the pump station 1 is determined based on the determined back pressure downstream the non-return valve 6, a pressure difference corresponding to the difference in height position (Y) between the downstream side of the non-return valve 6 and the outlet 4 of the pump 2 and a pressure difference corresponding to the difference in height position between the liquid level 14 in the tank 8 and the outlet 4 of the pump 2. Relevant for both submerged level sensor 9 and dry installed level sensor.

According to various embodiments, the Geodetic head (Hgeo) of the pump station 1 is determined based on the determined back pressure downstream the non-return valve 6, a pressure difference corresponding to the difference in height position (Y) between the downstream side of the non-return valve 6 and the outlet 4 of the pump 2, a pressure difference corresponding to the difference in height position (X) between the liquid level 14 in the tank 8 and the level sensor 9 located in the tank 8, and a pressure difference corresponding to the difference in height position (Z) between the outlet 4 of the pump 2 and the level sensor 9 located in the tank 8, i.e. back pressure+Y−X+Z.

In all embodiments the back pressure at the downstream side of the non-return valve 6 is preferably measured/determined using the pressure sensor 7 when the non-return valve 6 is closed. The back pressure measured by the pressure sensor 7 located on the downstream side of the non-return valve 6, is determined when the non-return valve 6 is closed. The non-return valve 6 may be closed by turning the pump 2 OFF, or by decreasing the operational speed of the pump 2 until there is no pumped flow leaving the pump station 1. Thus, when using the pressure sensor 7, the term "difference in height position (Y) between the pressure sensor 7 and the outlet of the pump 2" shall be considered equivalent to and the same as the term "difference in height position (Y) between the downstream side of the non-return valve 6 and the outlet 4 of the pump 2" throughout the present application.

The Total head (Htot) of the pump 2 is equal to a socalled Dynamic head (Hdyn) of the pump 2 plus the Static head (Hstat) of the pump 2. The Dynamic head (Hdyn) of the pump 2 is the dynamic flow loses over the pump 2 and the Static head (Hstat) of the pump 2 is the static pressure in the liquid leaving the pump 2 and that can be used for lifting/transporting the liquid.

The "system curve" may be a theoretical/predetermined "system curve" provided for the specific pump station 1 or a real/measured "system curve" obtained on site. Knowing that the Total head (Htot) of the pump 2 is equal to the "system curve" at different pump operation duty points. Thus, a real "system curve" may be provided by operating the pump 2 at different operational speeds (operational duty points) providing different "pump curves" and a set of many intersections between different "pump curves" and measured pumped flows will make up a true/real "system curve". Thereto, when the pump 2 is active and at the highest operation duty point transporting no liquid, i.e. Q=0, the Dynamic head (Hdyn) of the pump 2 is zero and the Static head (Hstat) of the pump 2 is equal to the Total head (Htot) of the pump" and thereto there are no losses in the outlet piping and thereby the Static head (Hstat) of the pump 2 is equal to the Geodetic head (Hgeo) of the pump station 1, i.e. the "system curve" at zero flow. In the disclosed embodiment in FIG. 2 the momentary Geodetic head (Hgeo) of the pump station is equal to about 4 meters, i.e. for a specific liquid level 14 in the tank 8.

According to various embodiments, the pump 2 is turned ON and the pumped Flow (Q) is determined by measuring the static pressure (Hmeasure) at the downstream side of the non-return valve 6 using the pressure sensor 7 when the pump 2 is operated at the given pump operation duty point and is pumping liquid passed the non-return valve 6, wherein the Static head (Hstat) of the pump 2 is determined based on the measured static pressure (Hmeasure) and a pressure difference corresponding to the difference in height position between the downstream side of the non-return valve 6 and the liquid level 14 in the tank 8, and thereafter determining the pumped Flow (Q) using the determined Static head (Hstat) of the pump 2 from the predetermined pump 2 specific Q-Hstat-relationship. Relevant for both submerged level sensor 9 and dry installed level sensor. In the embodiment disclosed in FIG. 2, the Static head (Hstat) of the pump is equal to about 5.8 meters and the intersection between H=5.8 meters and the Static head (Hstat) solid line in FIG. 2 gives a pumped Flow (Q) equal to 35 litres/second.

According to various alternative embodiments, the Static head (Hstat) of the pump 2 is determined based on the measured static pressure (Hmeasure), a pressure difference corresponding to the difference in height position (Y) between the downstream side of the non-return valve 6 and the outlet 4 of the pump 2, a pressure difference corresponding to the difference in height position (X) between the liquid level 14 in the tank 8 and the level sensor 9 located in the tank 8, and a pressure difference corresponding to the difference in height position (Z) between the outlet 4 of the pump 2 and the level sensor 9 located in the tank 8, i.e. Hmeasure+Y−X+Z.

In all embodiments, the consumed Power (P) may be determined by using the determined pumped Flow (Q) from a predetermined pump 2 specific Q-P-relationship (FIG. 3), for each given pump operation duty point. The determined pumped Flow (Q) equal to 35 litres/second provides a consumed Power (P) equal to about 3.3 kW.

According to various embodiments, the pumped Flow (Q) for a given pump operation duty point may be measured/determined by a flowmeter 15 arranged in the outlet conduit 5 downstream the pump 2. According to various embodiments, the consumed power (P) for a given pump operation duty point may for instance be determined by a powermeter 16, i.e. based on measured inlet voltage to the pump 2 and the consumed current of the pump 2. The powermeter 16 is preferably part of the control unit 11.

A computer program product comprising instructions which, when the program is executed by a computer, cause the computer to carry out the steps of the inventive method in order to determine a Normalized Specific Energy (nSE). A non-transitory computer-readable storage medium having computer-readable program code portions embedded therein, wherein the computer-readable program code portions are configured to execute the steps of the inventive method in order to determine a Normalized Specific Energy (nSE) when executed by a computer. The computer program product and the non-transitory computer-readable storage medium are preferably arranged in the control unit 11.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

It shall be pointed out that the values of Y and Z may be programmed values or measured values.

The invention claimed is:

1. A method for monitoring and controlling the operation of a pump station, wherein the pump station comprises a tank for temporary storage of a liquid, at least one pump configured for transporting the liquid away from the tank, and an outlet conduit connected to an outlet of the pump, wherein the outlet conduit of the pump station comprises a non-return valve, the method comprising the steps of:
   a) determining the Geodetic head (Hgeo) of the pump station,
   b) determining the pumped Flow (Q) for a given pump operation duty point,
   c) determining the consumed Power (P) for the given pump operation duty point, and
   d) determining a Normalized Specific Energy (nSE) of the pump station based on the determined values of Geodetic head (Hgeo), pumped Flow (Q), and consumed Power (P), wherein (nSE)=(P/Q)/Hgeo,
   wherein the step of determining the Geodetic head (Hgeo) of the pump station includes the steps of:
   a1) closing the non-return valve, and
   a2) determining back pressure at a downstream side of the non-return valve.

2. The method of claim 1, further comprising determining the Geodetic head (Hgeo) of the pump station based on the back pressure determined downstream of the non-return valve and a pressure difference corresponding to a difference in height position between the downstream side of the non-return valve and a liquid level in the tank.

3. The method of claim 1, further comprising determining the Geodetic head (Hgeo) of the pump station based on the back pressure determined downstream of the non-return valve, a pressure difference corresponding to the difference in height position (Y) between the downstream side of the non-return valve and the outlet of the pump, and a pressure difference corresponding to a difference in height position between a liquid level in the tank and the outlet of the pump.

4. The method of claim 1, further comprising determining the Geodetic head (Hgeo) of the pump station based on the back pressure determined downstream of the non-return valve, a pressure difference corresponding to a difference in height position (Y) between the downstream side of the non-return valve and the outlet of the pump, a pressure difference corresponding to a difference in height position (X) between a liquid level in the tank and a level sensor located in the tank, and a pressure difference corresponding to a difference in height position (Z) between the outlet of the pump and the level sensor located in the tank.

5. The method of claim 1, wherein the pump station further comprises a pressure sensor located on the downstream side of the non-return valve.

6. The method of claim 5, wherein the step of determining the back pressure downstream of the non-return valve comprises measuring the back pressure at the downstream side of the non-return valve using the pressure sensor when the non-return valve is closed.

7. The method of claim 6, wherein the step of closing the non-return valve is performed by turning the pump OFF.

8. The method of claim 5, wherein the step of determining the pumped Flow (Q) includes the steps of:
- b1) measuring static pressure (Hmeasure) at the downstream side of the non-return valve using the pressure sensor when the pump is operated at the given pump operation duty point and is pumping liquid past the non-return valve, wherein a Static head (Hstat) of the pump is determined based on the measured static pressure (Hmeasure) and a pressure difference corresponding to a difference in height position between the downstream side of the non-return valve and a liquid level in the tank, and
- b2) determining the pumped Flow (Q) by using the determined Static head (Hstat) of the pump from a predetermined pump-specific Q-Hstat-relationship.

9. The method of claim 5, the step of determining the pumped Flow (Q) includes the steps of:
- b1) measuring static pressure (Hmeasure) at the downstream side of the non-return valve using the pressure sensor when the pump is operated at the given pump operation duty point and is pumping liquid past the non-return valve, wherein a Static head (Hstat) of the pump is determined based on the measured static pressure (Hmeasure), a pressure difference corresponding to the difference in height position (Y) between the downstream side of the non-return valve and the outlet of the pump, a pressure difference corresponding to the difference in height position (X) between the liquid level in the tank and the level sensor located in the tank, and a pressure difference corresponding to the difference in height position (Z) between the outlet of the pump and the level sensor located in the tank, and
- b2) determining the pumped Flow (Q) by using the determined Static head (Hstat) of the pump from a predetermined pump-specific Q-Hstat-relationship.

10. The method of claim 1, wherein the step of determining the consumed Power (P) includes using the determined pumped Flow (Q) from a predetermined pump-specific Q-P-relationship.

11. The method of claim 1, wherein the pump station further comprises a flowmeter located downstream of the at least one pump, wherein determining the pumped Flow (Q) includes obtaining measurement data from the flowmeter when the at least one pump is operated at the given pump operation duty point and is pumping liquid past the non-return valve.

12. The method of claim 1, wherein the pump station further comprises a power meter and the step of determining the consumed Power (P) includes obtaining measurement data from the power meter when the at least one pump is operated at the given pump operation duty point and is pumping liquid past the non-return valve.

13. The method of claim 1, wherein the pump station comprises a first pump station and the method further comprises:
- determining values for the Normalized Specific Energy (nSE) for the first pump station over time, for at least the first pump station and a second pump station operating under a different set of environmental conditions than the first pump station, or for the first pump station and the second pump station over time; and
- making at least one service, maintenance, or improvement decision relating to said first pump station or said second pump station based upon a comparison of the determined nSE values.

14. A non-transitory computer-readable storage medium having computer-readable program code portions embedded therein, the computer-readable program code portions configured to cause a computer to execute the method steps of claim 1 in order to determine the Normalized Specific Energy (nSE).

15. A pump station comprising:
- a tank for temporary storage of a liquid;
- at least one pump configured for transporting the liquid away from the tank;
- an outlet conduit connected to an outlet of the pump, the outlet conduit comprising a non-return valve and a pressure sensor located on a downstream side of the non-return valve; and
- a control unit configured for determining a Normalized Specific Energy (nSE) of the pump station based on determined values of Geodetic head (Hgeo) of the pump station, pumped Flow (Q) for a given pump operation duty point, and consumed Power (P) for the given pump operation duty point, wherein (nSE)=(P/Q)/Hgeo.

16. The pump station of claim 15, wherein the at least one pump is arranged in the tank.

17. The pump station of claim 15, further comprising a flowmeter located downstream of said at least one pump.

18. The pump station of claim 15, wherein the control unit is configured for at least partly controlling said at least one pump based on measurement data received from the pump station.

* * * * *